United States Patent [19]
Sweazey

[11] Patent Number: 5,504,747
[45] Date of Patent: Apr. 2, 1996

[54] ECONOMICAL PAYLOAD STREAM ROUTING IN A MULTIPLE-RING NETWORK

[75] Inventor: Paul M. Sweazey, San Jose, Calif.

[73] Assignee: Apple Computer, Inc., Sunnyvale, Calif.

[21] Appl. No.: 26,969

[22] Filed: Mar. 3, 1993

[51] Int. Cl.[6] .................................................. H04L 12/66
[52] U.S. Cl. ..................................... 370/85.14; 370/94.3
[58] Field of Search ........................... 370/85.13, 85.14, 370/85.5, 85.15, 85.4, 94.3; 340/895.05, 895.5

[56] References Cited

U.S. PATENT DOCUMENTS

| | | | |
|---|---|---|---|
| 4,901,312 | 2/1990 | Hui et al. | 370/85.14 |
| 5,081,621 | 1/1992 | Sugimoto | 370/85.13 |
| 5,086,426 | 2/1992 | Tsukakoshi et al. | 370/85.13 |
| 5,088,090 | 2/1992 | Yacoby | 370/85.13 |
| 5,165,019 | 11/1992 | Sweazey | 395/200 |
| 5,165,024 | 11/1992 | Sweazey | 395/325 |
| 5,179,553 | 1/1993 | Tanaka | 370/85.14 |
| 5,247,620 | 9/1993 | Fukuzawa et al. | 370/85.13 |
| 5,327,431 | 7/1994 | Heske, III et al. | 370/85.13 |

*Primary Examiner*—Benedict V. Safourek
*Assistant Examiner*—Ajit Patel
*Attorney, Agent, or Firm*—Burns, Doane, Swecker & Mathis

[57] ABSTRACT

The present invention is directed to a system for routing data between rings. A routing symbol is provided, and as it crosses a bridge, the local target address of the bridge is dropped, and the local source address of the bridge node (in the far side ring) is added to the routing symbol. Fields are shifted in the routing symbol so that the value that was in a hop field becomes the local target address in the new ring. Because the routing symbol that arrives at the ultimate target has been transformed into a source node list, the return path is available to the target.

9 Claims, 9 Drawing Sheets

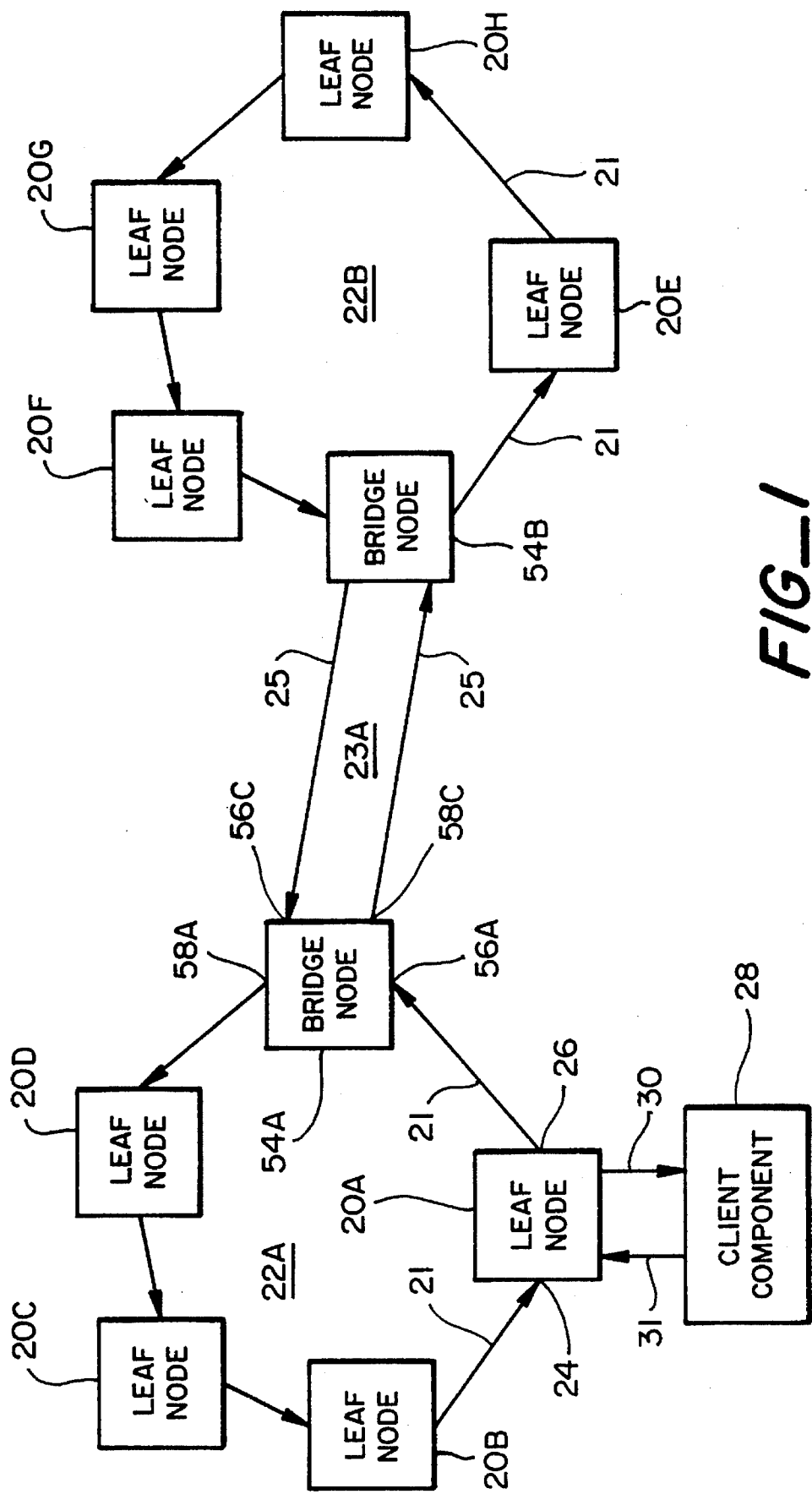
FIG_1

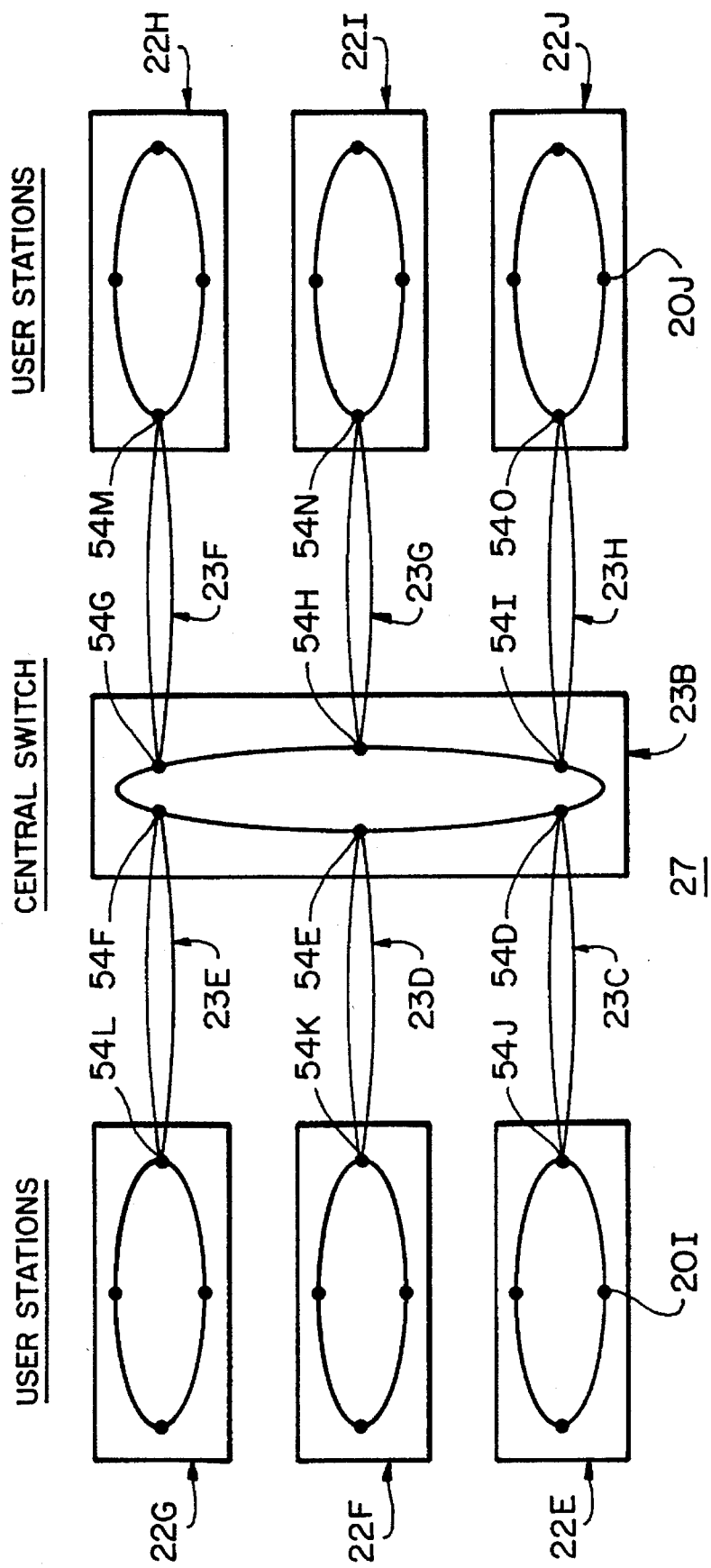
FIG_2

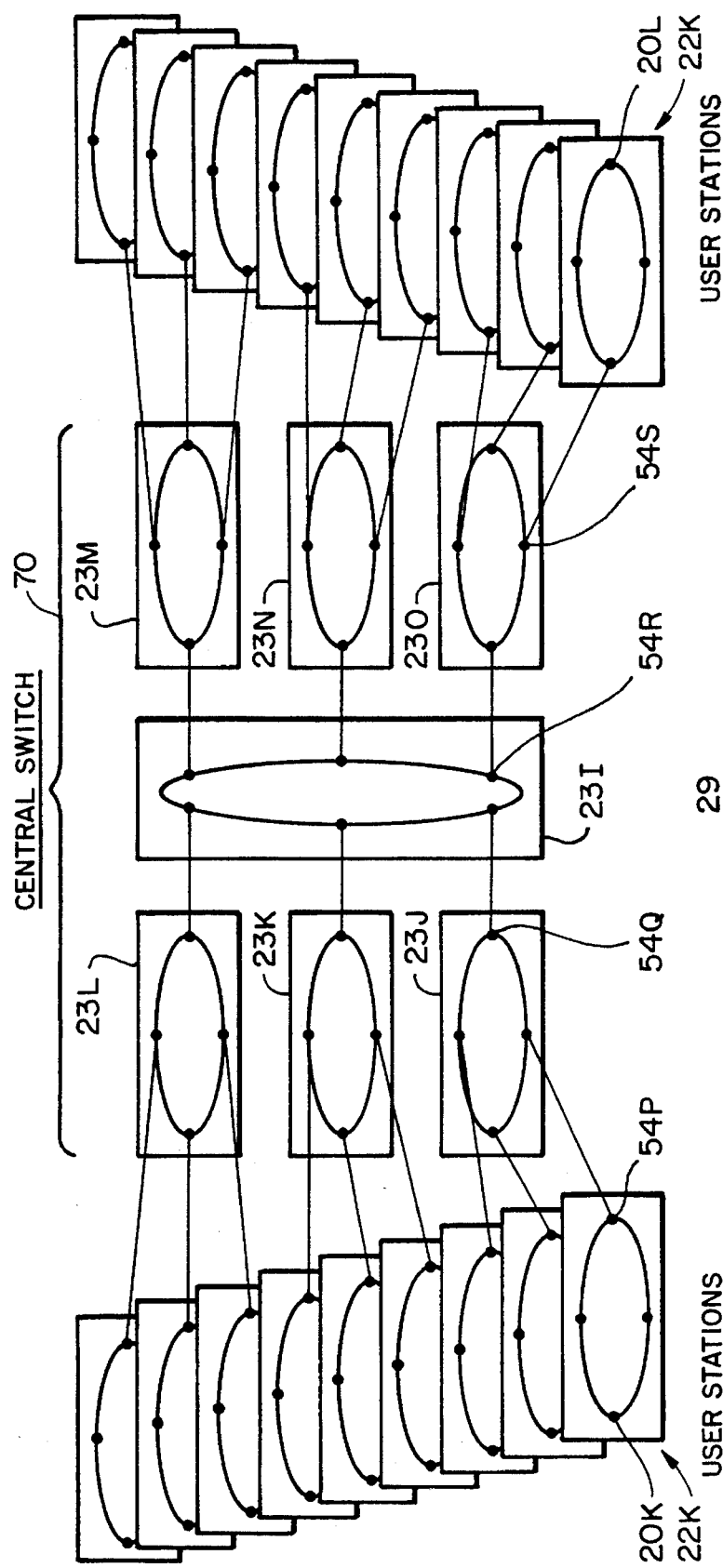
FIG_3

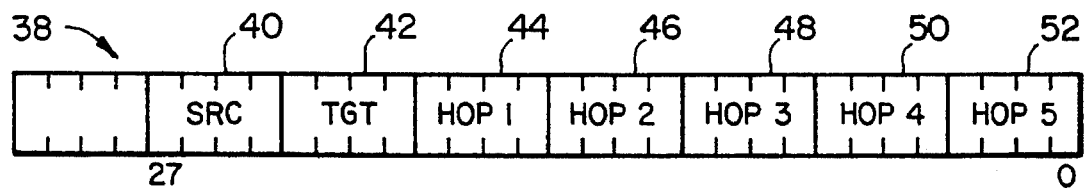
FIG_4
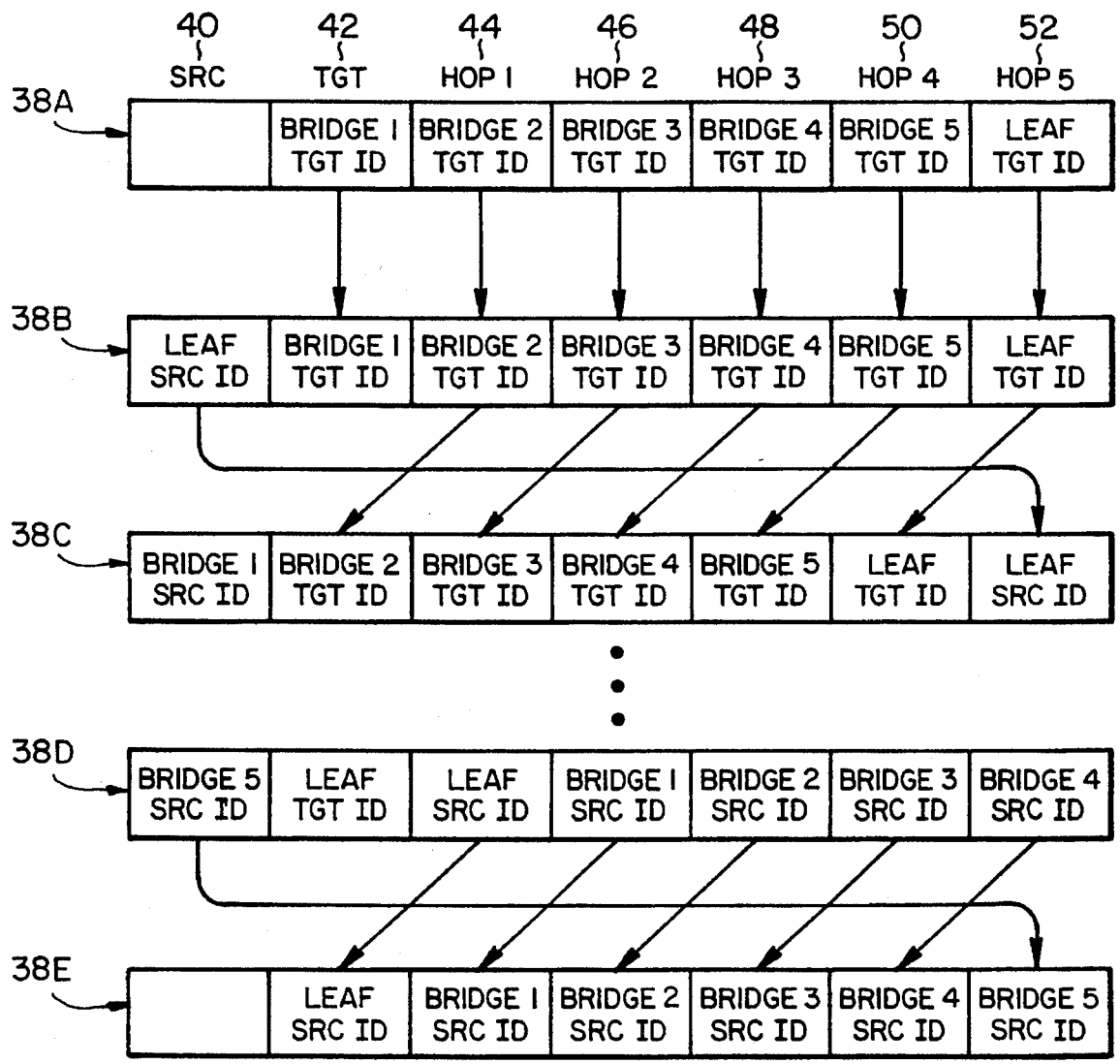
FIG_5

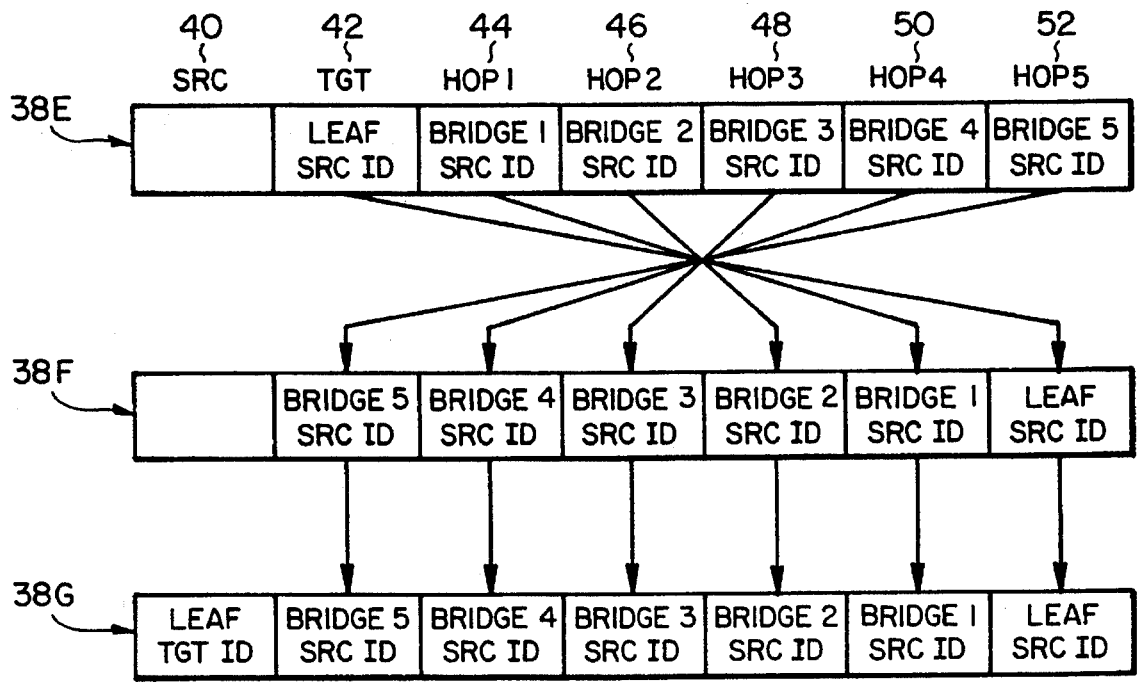
FIG_6
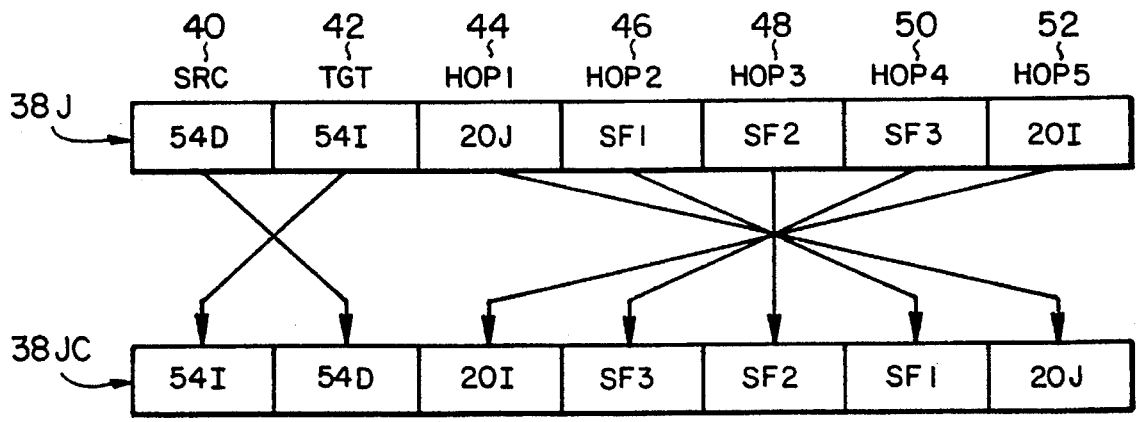
FIG_11

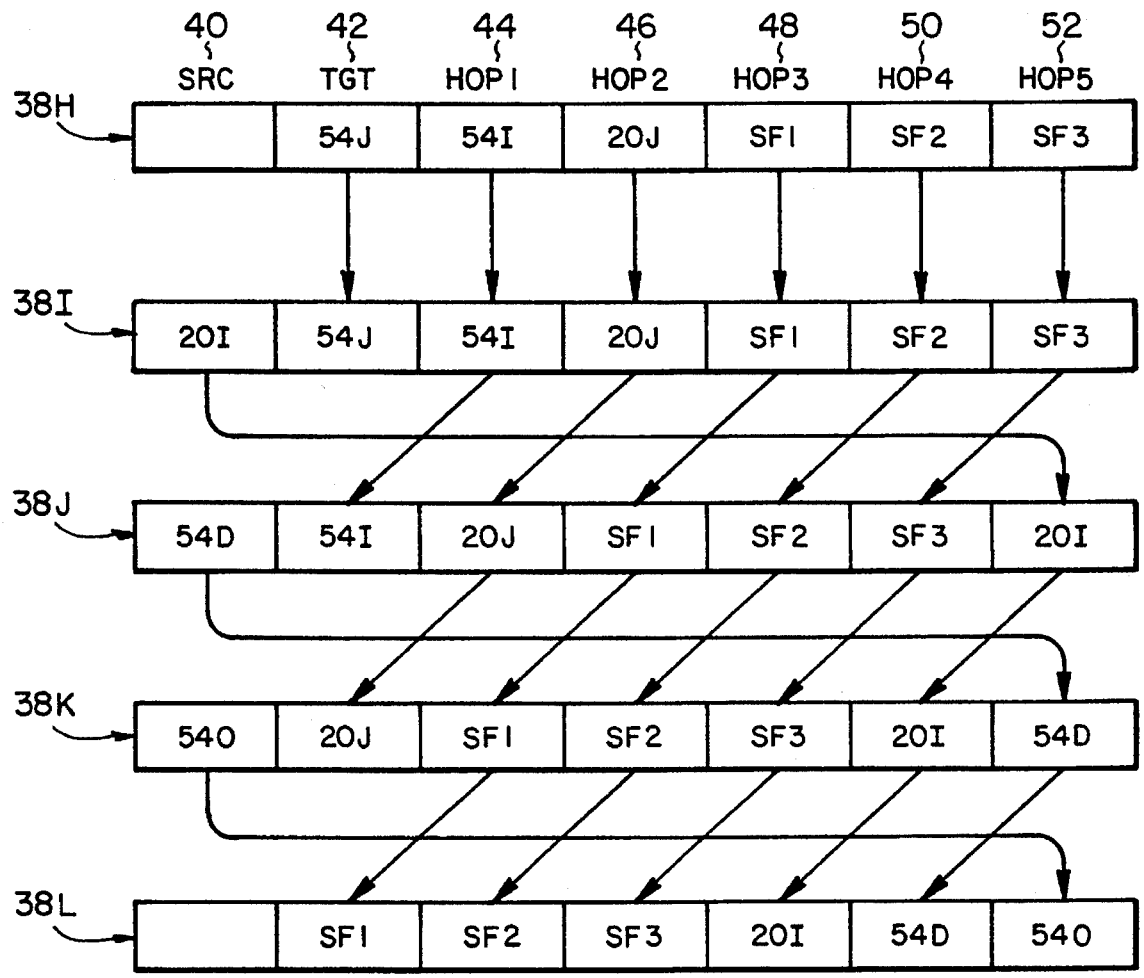
FIG_7A
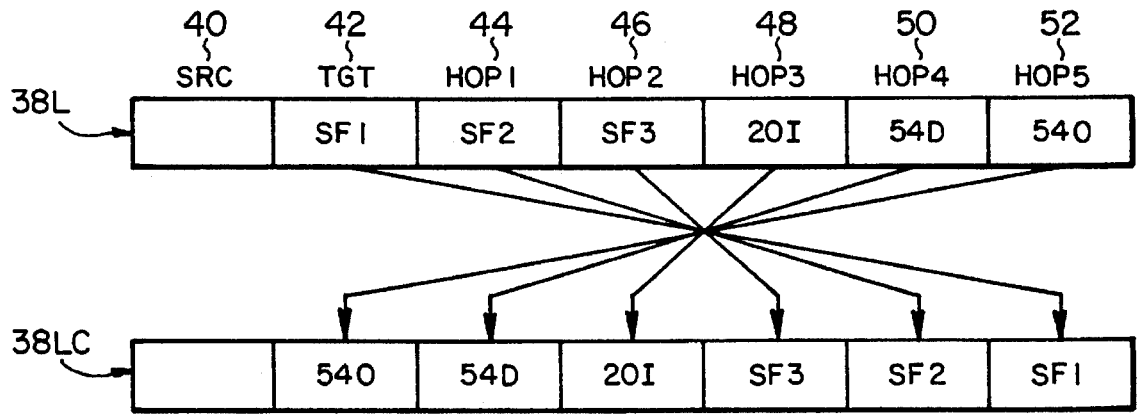
FIG_7B

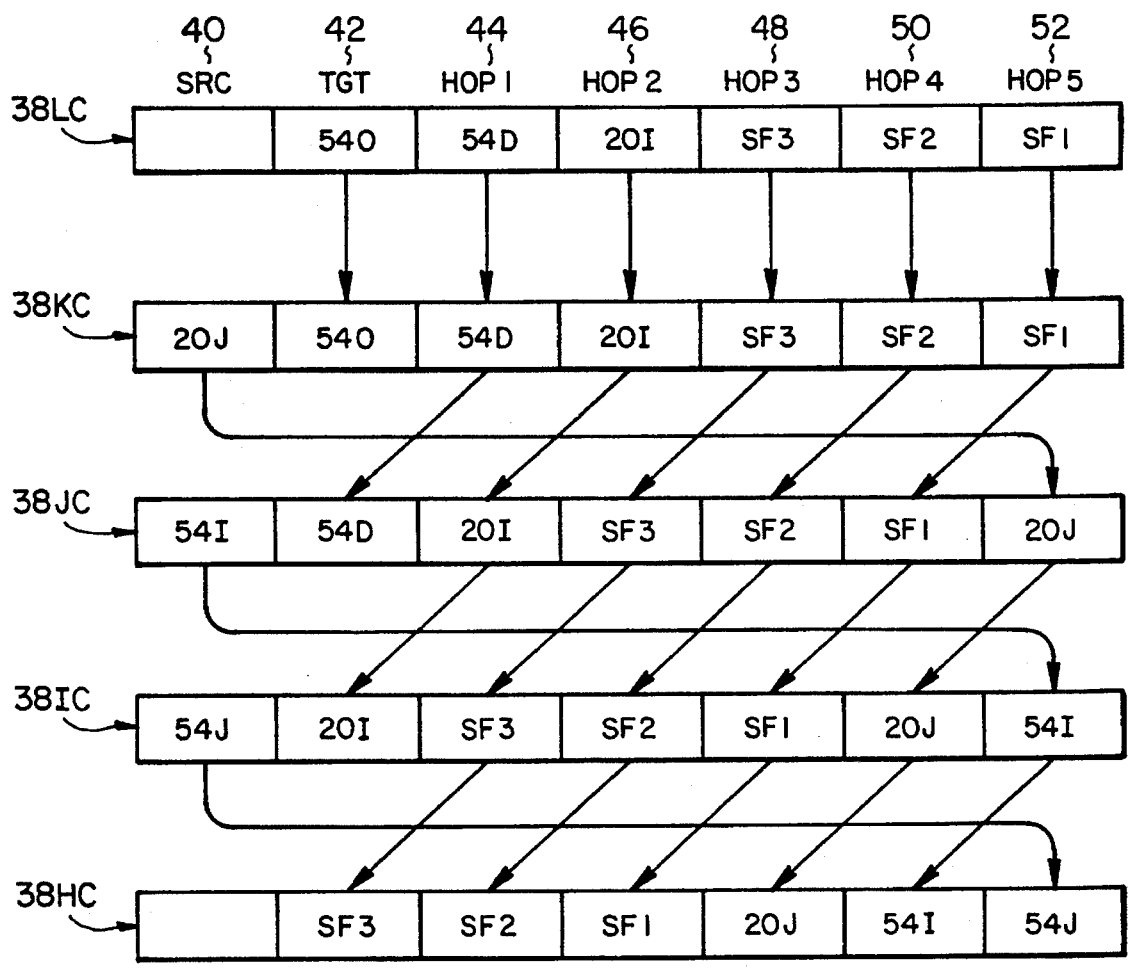
FIG_8A
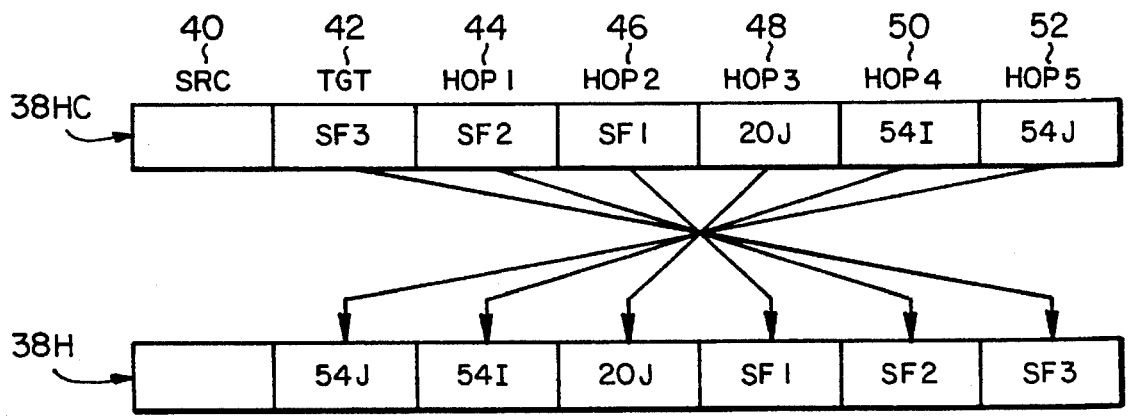
FIG_8B

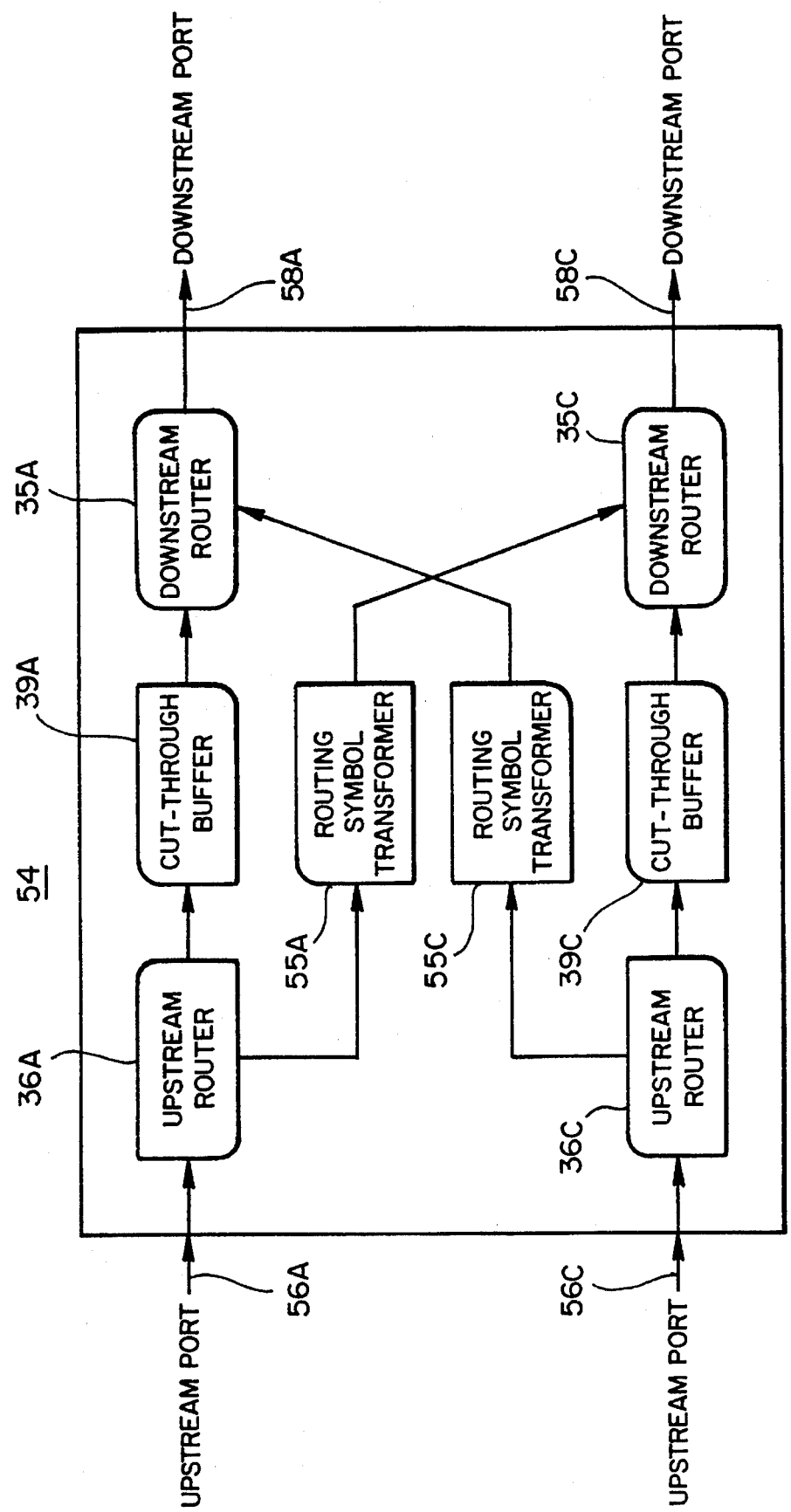
FIG_9

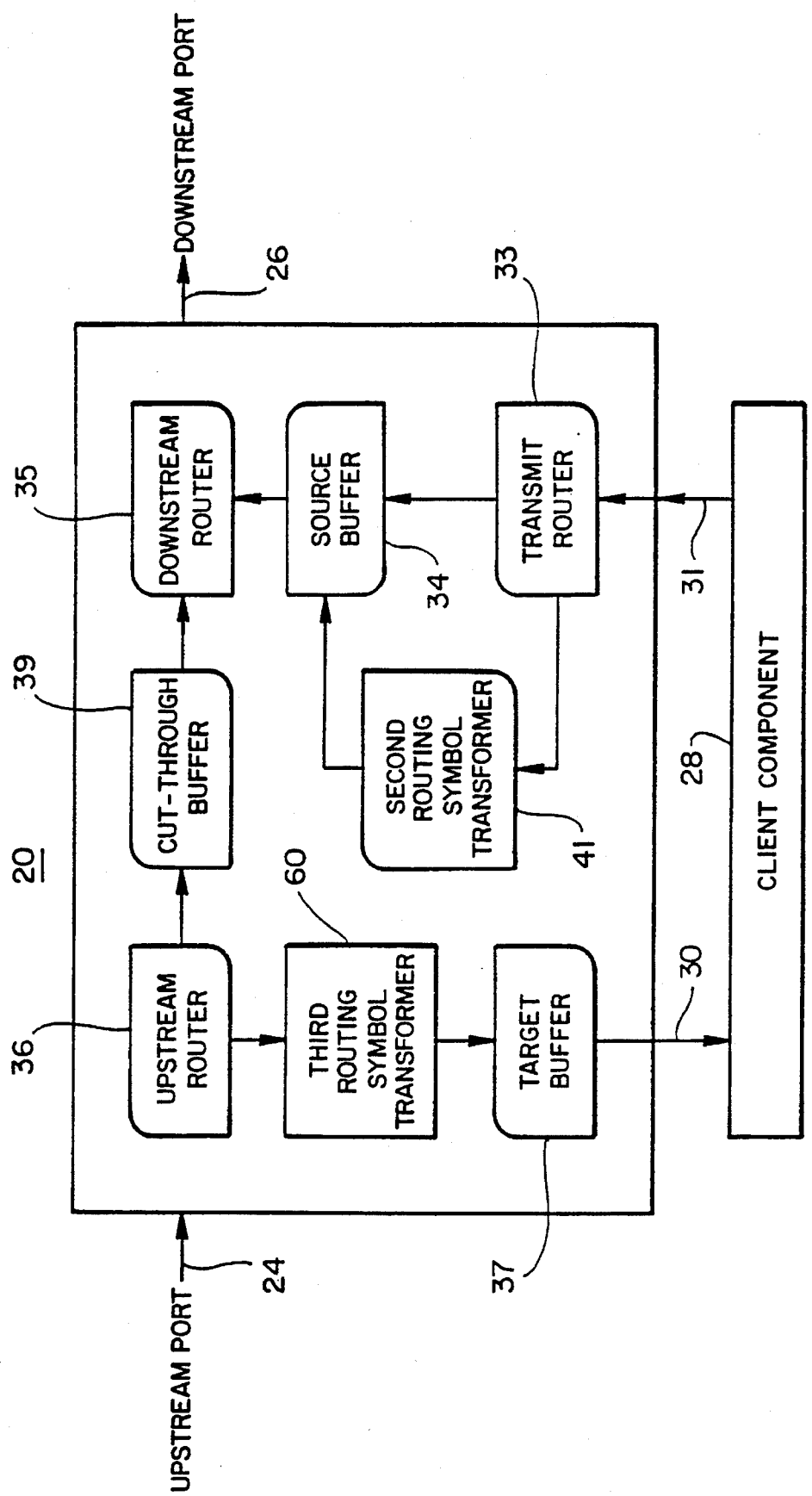
FIG_10

ECONOMICAL PAYLOAD STREAM ROUTING IN A MULTIPLE-RING NETWORK

BACKGROUND OF THE INVENTION

The present invention relates generally to interconnection circuitry, and more particularly to a system for handling data within a network of computer systems in a manner that a plurality of data sources can transfer information to a plurality of destinations simultaneously.

The typical computer system uses a busing arrangement as its primary interconnection to transfer information from one component of the system to another. In such a system, a component such as a central processor directs information to another component by placing the address to which the information is directed on the system address bus and the information on the system data bus. The destination for the information recognizes an address within its range of addresses and accepts the information available on the data bus. Each of these buses are made up of a number of conductors (for example, 32) which physically connect to each of the system components.

During the time that any particular source of information is using the system address and data buses, they are unavailable for use by any other source since all of the conductors of each bus available to carry either address or data information are occupied. In the past, busing arrangements have sufficed for transferring information in a typical personal computer or work station. However, functions such as the presentation of animated graphics and television involve the transfer of so much information that they tend to require an entire system to be devoted to their use. When it is desired to incorporate a number of these functions into the same computer system and run multiple operations simultaneously, a busing arrangement is incapable of handling the load.

To overcome the limitations of the aforementioned busing arrangement, various ring interconnection arrangements have been suggested. In these ring interconnection arrangements, each system component is directly connected by one-way connection paths to receive information from one other single system component and to send information to another single system component, thereby isolating each component from all but two other components. Each component forwards information around the ring until the information arrives at its destination. Even if the available bandwidth on each one-way connection in a ring is no greater than that available in a system data bus, the ring arrangement increases the amount of information that can be transferred because a number of sources of information can communicate with a number of destinations simultaneously.

Most ring-type systems suggested to date have retry systems where one system component places a packet of information on the ring addressed to another component. If the addressed component cannot handle the incoming information, it places a retry command on the ring. This causes the operation to be terminated, the transmitted information to be dumped, and the packet to be resent after some delay. Thus, the retry operation inherently slows the system when the amount of traffic on the system approaches saturation.

To overcome the problems of retry ring systems and to provide a system capable of transferring much more data than conventional computer arrangements, a new interconnect has been devised which is the subject of U.S. Pat. No. 5,165,024, entitled "Information Transfer and Receiving System With a Ring Interconnect Architecture Using Voucher and Ticket Signals", P. Sweazey, issued Nov. 17, 1992, and assigned to the assignee of this invention; U.S. Pat. No. 5,165,019, entitled "Ring Interconnect System Architecture", P. Sweazey, issued Nov. 17, 1992, and assigned to the assignee of this invention; and U.S. patent application Ser. No. 530,096, entitled "Improved Ring System Interconnect Architecture", P. Sweazey, filed on May 29, 1990, and assigned to the assignee of this invention. The entire disclosures of these two patents and the patent application are hereby incorporated by reference.

This new interconnect in its basic form is made up of a plurality of nodes, each such node being associated with at least one of a plurality of computer system components. The computer system component or components associated with the node is referred to as the "client" of the node. The nodes are connected in a unidirectional ring with transmission paths connecting each node to one node which is a source of information (a "source node"), and to another node which is a recipient of information (a "target node"). A plurality of unidirectional rings may be interconnected using individual ring nodes as bridges to connect separate rings. This creates a local area network of unidirectional rings.

This new interconnect is typically used as a secondary connection between the components of a computer system. The primary connection between these components is usually a busing arrangement such as the NuBus manufactured and used by Apple Computer, Inc., in its line of Apple Macintosh II personal computers.

Each node in a unidirectional ring includes apparatus for receiving information from and transferring information to its associated client. When a node's associated client desires to transfer information to another client of a different node, the client causes its associated node to generate and place a voucher signal on the transmission path to indicate that the node has information to be transmitted to another client component.

Each node includes storage space for information and apparatus which responds to the receipt of a voucher signal directed to it as a target node for determining whether the node is able to store information in its storage space. Each node also includes apparatus which responds to a determination by its client that storage space is available by placing a ticket signal on the transmission path (directed to the node which is to be the source of the information) to indicate that storage space is available.

When a source node receives such a ticket signal, it causes the information packet to be launched on the transmission path. In this manner, no information is propagated on the transmission path until space is available for it at the target node, and delays due to information rejection at the target node are eliminated.

Each node also includes circuitry to relay voucher and ticket signals, and information directed to another node, so that the information, voucher or ticket is passed along the transmission path to the correct node. Moreover, each node includes apparatus for assuring that both voucher and ticket signals are transferred by the node in preference to any information. By this means, the transferred information on the transmission path does not get in the way of and delay the signals which control the transmission of that information.

The transfer of information among nodes in various rings requires that each node in a ring have a unique address, or ID, in that ring. To do this, one node in a ring is designated as the ring master, and all other nodes on the ring are configured as slaves.

During initialization of the ring, special symbols are circulated around the ring to assign node ID numbers to each node. The master node assigns itself to be node 0. The master then begins to transmit a stream of identical symbols at the downstream port whose high-order four bits are [0,0,0,0]. The first slave node to receive this symbol increments the value to [0,0,0,1] and becomes node 1. Each slave node in turn increments the value and takes on its own unique node ID. When the master node receives the symbol at its upstream port, the value of the symbol is the largest ID number in the ring. The master node stores this value and forwards it around the ring, so that each node in the ring knows the total number of nodes in the ring.

In a multiple ring network, each ring contains one or more nodes that act as bridges to connect with other rings. These nodes are called bridge nodes. Unlike the other nodes in a ring, which are called leaf nodes, the bridge nodes do not receive or transmit information to associated client components. Instead, each bridge node is connected to another bridge node on a separate ring. The separate ring may include a combination of bridge nodes and leaf nodes, or may only contain bridge nodes.

The performance of various functions in a multiple ring network often requires client components in separate rings to exchange information in a back-and-forth fashion. A routing symbol is required to transfer data from a node which is a source of information (a "source node") to a node which is a recipient of information (a "target node"). A separate routing symbol is required to transfer data or control signals from the target node back to the source node. These control signals may instruct the source node to halt, resume, accelerate, or decelerate data transmission to the target node. Since the target node may not know the location in the network of the source node, the source node must provide both the routing symbol from the source node to the target node, and the return routing symbol from the target node to the source node. However, the transmission of two routing symbols by a source node consumes bandwidth that could be used to transmit data.

Accordingly, an object of the present invention is to allow a target leaf node to route a payload stream back to a source leaf node, based only on knowledge of the target leaf node's own local node address, without regard to the extent, complexity, or path redundancy of the total multiple-ring topology.

Another object of the present invention is to allow all routing information to be contained within a single routing symbol.

Yet another object of the present invention is to maximize the number, extent, and complexity of the possible multiple-ring topologies subject to the constraint of coding a routing path within a single routing symbol.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The method of the present invention includes routing streams of data between nodes on separate interconnection systems by generating a first routing symbol containing a first list of target bridge leaf nodes that describes a routing path from an initial source leaf node a target leaf node. This first routing symbol is transformed into an intermediate routing symbol at the first bridge along the communication path by replacing the target bridge node address (i.e., the address of the bridge node in the ring containing the source leaf node) with the source node address of the target bridge node, and shifting the first list of target bridge node addresses and leaf node address so that the next node address in line is targeted by the intermediate routing symbol. Each subsequent bridge node transforms a symbol in a similar way. Finally, the intermediate routing symbol is transformed into a second routing symbol by the target leaf node. The second routing symbol contains a second list of target bridge and leaf nodes that describes a routing path back to the initial source leaf node from the target leaf node.

Some portions of the detailed description which follows are presented in terms of algorithms in symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 1 is a block diagram of interconnects for computer systems constructed in accordance with the present invention.

FIG. 2 shows an alternate arrangement of the computer system interconnects shown in FIG. 1.

FIG. 3 shows a second alternate arrangement of the computer system interconnects shown in FIG. 1.

FIG. 4 schematically represents the arrangement of address fields in a routing symbol.

FIG. 5 schematically represents the transformation of a routing symbol as it crosses bridges on its way to a target leaf node.

FIG. 6 schematically represents the final transformation of a routing symbol performed by a target leaf node to create a new routing symbol.

FIG. 7A schematically represents the transformation of a routing symbol as it traverses the computer system interconnects shown in FIG. 2 on its way to a target leaf node.

FIG. 7B schematically represents the final transformation of a routing symbol performed by a target leaf node shown in FIG. 2 to create a new routing symbol.

FIG. 8A schematically represents the transformation of a routing symbol as it traverses the computer system interconnects shown in FIG. 2 on its way back to a source leaf node.

FIG. 8B schematically represents the final transformation of a routing symbol performed by a source leaf node shown in FIG. 2 to create a new routing symbol.

FIG. 9 is a block diagram of a bridge node used in the computer system interconnects shown in FIGS. 1–3.

FIG. 10 is a block diagram of a leaf node used in the computer system interconnects shown in FIGS. 1–3.

FIG. 11 schematically represents a transformation of a routing symbol into its complement routing symbol.

DESCRIPTION OF THE PREFERRED EMBODIMENT

The present invention will be described in terms of the preferred embodiment. The preferred embodiment is a system for economical payload stream routing in a multiple-ring network. Such a structure is shown in FIG. 1. In this description, rings including both leaf nodes and bridge nodes will be referred to by general reference numeral 22. Rings including only bridge nodes will be referred to by general reference numeral 23. Leaf nodes will be referred to by general reference numeral 20, and bridge nodes will be referred to by general reference numeral 54.

In this description, the following definitions are used: A symbol is any quantity of data that can be transferred on a parallel data path during one phase of a clock cycle. A stream is a logically-contiguous sequence of data symbols of arbitrary length. A packet is a portion of a stream having a fixed length consisting of one head symbol and data or information symbols (the "payload"), the last of which is called a tail symbol. The first symbol in a packet of information is thus a head symbol and the last is a tail symbol. Each symbol used with the ring interconnect includes bits which identify a subset of the following elements: its source node, its target node, the stream with which it is associated, its level or urgency, and an indication of the type of symbol (voucher, ticket, routing, head, data, or tail).

The circuit of FIG. 1 is similar to the systems disclosed in the above-noted co-pending application and issued patents, which have been incorporated by reference, except that various elements thereof have been modified in order to provide the improvements of this invention. In FIG. 1, a leaf node 20A of a ring interconnect arrangement ("ring") 22A is illustrated. Ring 22A has a number of individual leaf nodes 20A–20D, each of which may be associated with one of its client components, e.g., central processing unit, random access memory, etc. of a computer system. Each node in a ring is connected to its neighboring nodes via ring transmission medium 21. Medium 21 may be a made up of a number of conductors which physically connect these nodes. Since all of the leaf nodes of ring 22A are similar, only leaf node 20A will be described.

Referring now to FIGS. 1 and 10, leaf node 20A includes an upstream port 24 connected to receive information and a downstream port 26 connected to transmit information in ring 22A. Leaf node 20A also includes a receive port 30 through which information is transferred to the associated client component 28 and a transmit port 31 through which information is transferred from associated client component 28.

Typically, a stream of information enters leaf node 20A through transmit port 31 from client component 28. After entering transmit port 31, this stream of information flows through transmit router 33, source buffer 34, and downstream router 35 before being transferred to ring 22A through downstream port 26. Information directed on ring 22A to leaf node 20A arrives at upstream port 24 of leaf node 20A and is transferred to associated client component 28 via upstream router 36, third routing symbol transformer 60, target buffer 37, and receive port 30. Information arriving at upstream port 24 of leaf node 20A not directed to leaf node 20A may be forwarded to the other leaf nodes 20B, 20C, and 20D on ring 22A via upstream router 36, cut-through buffer 39, downstream router 35 and downstream port 26.

A single ring 22 may contain as many as 16 leaf nodes or as few as a single leaf node. By definition, in a single ring configuration, all nodes are leaf nodes —each is acting as the original source or ultimate destination of a stream, not as a bridge to another ring. However, all of the rings described in the present disclosure include bridge nodes 54 to connect to other rings.

Bridge nodes 54A and 54B within local rings 22A and 22B, respectively, provide some of the same functionality as provided by leaf nodes 20A–20H, in that bridge nodes 54A and 54B forward information downstream that is not directed to them. Since bridge nodes 54A and 54B are similar, only bridge node 54A will be discussed.

Referring now to FIGS. 1 and 9, bridge node 54A always acts as an active segment of two rings 22A and 23A, having two upstream ports 56A and 56C, and two downstream ports 58A and 58C. A bridge ring 23 may include up to 16 bridge nodes 54 connected by bridge ring transmission medium 25. Medium 25 may be made up of a number of conductors or fiber optic cables connecting the bridge nodes together.

Bridge node 54A receives symbols at its upstream ports 56A and 56C. Information directed on ring 22A to bridge node 54A arrives at upstream port 56A of bridge node 54A and is forwarded through to ring 23A via upstream router 36A, routing symbol transformer 55A, downstream router 35C and downstream port 58C. Information arriving at upstream port 56A of bridge node 54A not directed to a leaf node 20 on another ring 22 by way of bridge node 54A is forwarded to leaf nodes 20A, 20B, 20C, and 20D on ring 22A via upstream router 36A, cut-through buffer 39A, downstream router 35A and downstream port 58A.

Similarly, information directed on ring 23A to bridge node 54A (as would happen automatically in a degenerate two node ring) arrives at upstream port 56C of bridge node 54A and is forwarded through to ring 22A via upstream router 36C, routing symbol transformer 55C, downstream router 35A and downstream port 58A. Information arriving at upstream port 56C of bridge node 54A not directed to bridge node 54A (note that this would occur only if ring 23A included more than two bridge nodes) may be forwarded to other nodes on ring 23A via upstream router 36C, cut-through buffer 39C, downstream router 35C and downstream port 58C.

A class of symbols called routing symbols cause client streams to be routed around rings and across bridge nodes so as to arrive at the desired target leaf node. A routing symbol is a symbol containing the address of the source node, the address of the target node, and the addresses of bridge nodes that need to be crossed to reach the target node. A physical addressing scheme is used to exclusively identify the entire network path. Even in the presence of multiple alternate paths, a particular path is selected and specified by the source node. Any fields of the routing symbol that are not needed to specify the path are used to distinguish between logically-distinct routing symbols with the same path.

For every stream from a source node to a target node there is a complement stream from the target node to the source node. These stream pairs are special because the routing symbol of a complement stream can always be computed from the routing symbol of the original stream, and repeating the computation returns the original routing symbol. The routing symbol of a stream will differ at each point in the path, but the set of routing symbols along the path of a stream is always unique to that stream. At every point in the path (on a ring or at a client port) the complement routing symbol at that point can be computed from the routing symbol at the same point. Given any routing symbol and the network topology, all other routing symbols of the same stream and of its complement stream may be computed.

Referring now to FIG. 4, the low order 28 bits of a routing symbol 38 contain two 4-bit fields ("nibbles") identifying the source node and the target node in a single ring. These are source (Src) field 40 and target (Tgt) field 42. For networks involving multiple rings connected by bridges (see also FIGS. 2 and 3), target field 42 identifies the source ring target address of the first bridge to be crossed by the stream. Five subsequent 4-bit fields, called hop fields, identify the local ring target addresses of each bridge node between the original source and ultimate target, ending with the local ring address of the ultimate target node itself. These are Hop 1 field 44, Hop 2 field 46, Hop 3 field 48, Hop 4 field 50, and Hop 5 field 52. As will be apparent to those skilled in the art, there may be more or fewer than five hop fields used in the present invention. The number of hop fields used in a routing symbol depends on the number of bridges to be crossed in route to a target.

In the case of a single ring, the routing of streams consumes source field 40, target field 42 and no hop fields, while routing in a multiple ring system consumes source field 40, target field 42 and one or more hop fields. Bridge rings such as bridge ring 23A containing only two bridge nodes 54A and 54B ("degenerate" two node rings) provide important addressing advantages in a multiple ring network. With only two nodes in such a ring, addressing is a superfluous function because there is never any doubt that a symbol transmitted by either bridge node is destined for the only other node in the two-node ring. Thus, a routing symbol can cross a degenerate two node ring simply by addressing the bridge node needed to enter the ring. There is no need to address the bridge node needed to exit the ring.

For example, routing between leaf node 20A of ring 22A and leaf node 20F of ring 22B consumes source field 40 (containing the ring 22A address of leaf node 20A), target field 42 (containing the ring 22A address of bridge node 54A), and Hop 1 field 44 (containing the ring 22B address of leaf node 20F). The address in target field 42 enters bridge ring 23A via bridge 54A and then automatically enters (because of the degenerate nature of two-node ring 23A) target ring 22B. Hop 1 field 44 then identifies ultimate target leaf node 20F in ring 22B.

Referring now to FIG. 2, a robust, multiple ring local area network can be constructed using a central switch (ring) 23B made of bridge nodes 54D–54I. Each bridge node 54D–54I respectively in central switch 23B is attached via degenerate two node bridge rings 23C–23H, respectively, to bridge nodes 54J–54O, respectively, in separate rings (referred to as "user stations") 22E–22J. Each user station 22E–22J contains a plurality of leaf nodes 20. The connections between the nodes in each user station of FIG. 2 are identical to those shown in FIG. 1.

By taking advantage of the address-free nature of degenerate two-node bridge rings, the central switch star network 27 of FIG. 2 is a 2-hop topology. For example, routing a stream from leaf node 20I in user station 22E to leaf node 20J in user station 22J would require the following to be present in first routing symbol 38I (see FIG. 7A): source field 40 containing the user station (ring) 22E address of leaf node 20I; target field 42 containing the user station (ring) 22E address of bridge node 54J; Hop 1 field 44 containing the central switch (ring) 23B address of bridge node 54I; and Hop 2 field 46 containing the user station (ring) 22J address of leaf node 20J.

A much larger number of user stations can be supported by a central switch star network 29 with a 4-hop topology, as shown in FIG. 3. Central switch star network 29 includes a series of user stations (rings) 22, and a central switch (ring) 70, which further includes three layers of bridge rings 23. The central layer of central switch 70 consists of a bridge ring 23I, with each bridge node 54 connected to another ring of bridge nodes. The other two layers consist of bridge rings 23J–23L and 23M–23O. All but one bridge node 54 in bridge rings 23J–23O are connected to user stations 22. Each user station 22 includes leaf nodes 20 and one bridge node 54. The other bridge node in rings 23J–23O are connected to a bridge node in central bridge ring 23I.

For example, routing a stream from leaf node 20K in user station 22K to leaf node 20L in user station 22L would require the following to be present in a routing symbol 38: source field 40 containing the user station (ring) 22L address of leaf node 20K; target field 42 containing the user station (ring) 22K address of bridge node 54P; Hop 1 field 44 containing the central switch (ring) 23J address of bridge node 54Q; Hop 2 field 46 containing the central switch (ring) 23I address of bridge node 54R; Hop 3 field 48 containing the central switch (ring) 23O address of bridge node 54S; and Hop 4 field 50 containing the user station (ring) 22L address of leaf node 20L.

The maximum number of user stations that can be supported in the four-hop system illustrated in FIG. 3 depends on the maximum number of nodes in a ring. In the preferred embodiment where each ring can have up to sixteen nodes, there is a theoretical limit of 240 user stations.

The actual method by which hop fields are used in the routing of streams between rings involves a shifting of fields within a routing symbol 38 upon passage through each bridge node 54. A generalized example for the shifting of fields in a 5-hop communication is given below.

Referring now to FIGS. 5 and 10, client 28 of a source leaf node 20 (i.e. a leaf node that transmits information generated by its client) creates a first preliminary routing symbol 38A at transmit port 31 that contains an ordered list of target bridge nodes within each ring, and the local ring address of the leaf node that is the ultimate target for a 5-hop communication.

More specifically, first preliminary routing symbol 38A contains information in six of its seven 4-bit fields: target field 42 containing the local ring target address of the first bridge to be crossed ("Bridge 1 Tgt ID"); Hop 1 field 44 containing the local ring target address of the second bridge to be crossed ("Bridge 2 Tgt ID"); Hop 2 field 46 containing the local ring target address of the third bridge to be crossed ("Bridge 3 Tgt ID"); Hop 3 field 48 containing the local ring target address of the fourth bridge to be crossed ("Bridge 4 Tgt ID"); Hop 4 field 50 containing the local ring target address of the fifth bridge to be crossed ("Bridge 5 Tgt ID"); and Hop 5 field 52 containing the local ring address of the leaf node that is the ultimate target ("Leaf Tgt ID").

First preliminary routing symbol 58A does not include the local ring address of source leaf node 20 ("Leaf Src ID"). This value is fixed during the initialization of the ring containing the source leaf node 20. A first routing symbol 38B is created by source leaf node 20 when second routing symbol transformer 41 adds the local ring address of source leaf node 20 to source field 40 of first preliminary routing symbol 38A. First routing symbol 38B is then placed on the local ring of leaf node 20 through downstream port 26. As will be apparent to those skilled in the art, first routing symbol 38B could also be created in one step by client 28 of source leaf node 20.

As first routing symbol 38B crosses the first bridge (Bridge1), first intermediate routing symbol 38C is created by routing symbol transformer 55 of bridge node 54 (see FIG. 9). The target address of Bridge1 in target field 42 of first routing symbol 38B is dropped, and the local address of Bridge1 (in the far side ring) is added to first intermediate routing symbol 38B in source field 40. Note that in degenerate two node rings such as ring 23A in FIG. 1, the bridge source address placed in source field 40 is the source address of the bridge node used to exit ring 23A. For example, if a data stream is to be routed from ring 22A to ring 22B, the source address for bridge node 54B in ring 22B would be added to source field 40.

At the same time, the address that had originally been in source field 40 of first routing symbol 38B is placed in Hop 5 field 52 of first intermediate routing symbol 38C, and what had been in Hop 2 field 46, Hop 3 field 48, Hop 4 field 50, and Hop 5 field 52 of first routing symbol 38B are transferred to Hop 1 field 44, Hop 2 field 46, Hop 3 field 48, Hop 4 field 50, respectively, of first intermediate routing symbol 38C. What had been in Hop 1 field 44 of first routing symbol 38B is transferred to target field 42 of first intermediate routing symbol 38C.

This process, referred to as a bridge transformation, is repeated at each bridge ring 23, creating as many intermediate routing symbols 38 as are necessary until the final destination is reached, i.e., until routing symbol 38 is absorbed into the target leaf node (Leaf Tgt). In this example, this occurs when the target leaf node absorbs fifth intermediate routing symbol 38D. After routing symbol 38D is absorbed into the target leaf node, but before it is absorbed into the client of the leaf node, one further transformation of the type described above is performed by third routing symbol transformer 60 (see FIG. 10) creating sixth intermediate routing symbol 38E. FIG. 5 shows the final transformation of fifth intermediate routing symbol 38D into sixth intermediate routing symbol 38E.

If the client of the target node (Leaf Tgt) wishes to route a new data stream back to the source of the original data packet, a further transformation is performed on sixth intermediate routing symbol 38E by client 28 of target leaf node 20 (see FIG. 10). This is referred to as a client transformation.

As is shown in FIG. 6, a second preliminary routing symbol 38F is created by placing the contents of target field 42 of sixth intermediate routing symbol 38E into Hop 5 field 52 of second preliminary routing symbol 38F, and placing the contents of Hop 5 field 52 of sixth intermediate routing symbol 38E into target field 42 of second preliminary routing symbol 38F. The contents of Hop 1 field 44 of sixth intermediate routing symbol 38E is moved to Hop 4 field 50 of second preliminary routing symbol 38F, and Hop 4 field 50 of sixth intermediate routing symbol 38E is moved to Hop 1 field 44 of second preliminary routing symbol 38F; the contents of Hop 2 field 46 of sixth intermediate routing symbol 38E is moved to Hop 3 field 48, and the contents of Hop 3 field 48 of sixth intermediate routing symbol 38E is moved to Hop 2 field 46 of second preliminary routing symbol 38F.

Second routing symbol transformer 41 of target node 20 then creates a second routing symbol 38G from second preliminary routing symbol 38F by adding the local ring address of the target leaf node to source field 40 of second preliminary routing symbol 38F.

The transformation method shown in FIG. 6 used to create a second preliminary routing symbol from an intermediate routing symbol will work properly if the bridge transformation method shown in FIG. 5 is performed between one and five times. In addition, the complement to any routing symbol can be created at any point along the path of the routing symbol. These features will be shown by tracing the transformation of a routing symbol 38 as it travels from leaf node 20I to leaf node 20J and back again in central switch star network 27 of FIG. 2. As discussed above, central switch star network 27 is a 2-hop topology.

Referring now to FIGS. 7A and 10, to route a stream of data from leaf node 20I to leaf node 20J, client 28 of leaf node 20I must create a first preliminary routing symbol 38H containing the following: target field 42 containing the user station (ring) 22E address of bridge node 54J; Hop 1 field 44 containing the central switch (ring) 23B address of bridge node 54I; and Hop 2 field 46 containing the user station (ring) 22J address of leaf node 20J. Hop 3 field 48, Hop 4 field 50, and Hop 5 field 52 are spares that could be used to distinguish between logically distinct streams with the same path. For the purposes of this example, Hop 3 field 48, Hop 4 field 50, and Hop 5 field 52 of first preliminary routing symbol 38H will contain Spare Fields SF1, SF2, and SF3, respectively.

As was shown above, second routing symbol transformer 41 of leaf node 20I (see FIG. 10) creates a first routing symbol 38I by adding the user station (ring) address of leaf node 20I to first preliminary routing symbol 38H. Again, it should be apparent to those skilled in the art that client 28 (not shown) of leaf node 20I could create first routing symbol 38I in a single step.

As first routing symbol 38I enters bridge node 54J and thus automatically crosses bridge ring 23C (because of the degenerate nature of bridge ring 23C), a first intermediate routing symbol 38J is created by routing symbol transformer 55 of bridge node 54D (see FIG. 9). The user station (ring) 22E address of bridge node 54J in target field 42 of first routing symbol 38I is dropped, and the central switch (ring) 23B address of bridge node 54D is added to first intermediate routing symbol 38J in source field 40.

At the same time, user station (ring) 22E address of leaf node 20I in source field 40 of first routing symbol 38I is placed in Hop 5 field 52 of first intermediate routing symbol 38J, and what had been in Hop 2 field 46 (the user station (ring) 22J address of leaf node 20J), Hop 3 field 48, (SF1), Hop 4 field 50, (SF2), and Hop 5 field 52 (SF3) of first routing symbol 38I are transferred to Hop 1 field 44, Hop 2 field 46, Hop 3 field 48, Hop 4 field 50, respectively, of first intermediate routing symbol 38J. Central switch (ring) 23B address of bridge node 54I, which had been in Hop 1 field 44 of first routing symbol 38I, is transferred to target field 42 of first intermediate routing symbol 38J.

As was mentioned above, this bridge transformation is repeated, creating as many intermediate routing symbols 38 as are necessary until the final destination is reached, i.e., until the intermediate routing symbol is absorbed into leaf node 20J. In this example, the bridge transformation needs to be repeated once more.

As shown in first intermediate routing symbol 38J, bridge node 54I is targeted next. As first intermediate routing symbol 38J enters bridge node 54I and thus automatically crosses bridge ring 23H (because of the degenerate nature of bridge ring 23H), second intermediate routing symbol 38K is created by routing symbol transformer 55 of bridge node 54O (see FIG. 9). The central switch (ring) 23B address of bridge node 54I in target field 42 of first intermediate routing symbol 38J is dropped, and the user station (ring) 22J address of bridge node 54O is added to second intermediate routing symbol 38K in source field 40.

At the same time, the central switch (ring) 23B address of bridge node 54D in source field 40 of first intermediate routing symbol 38J is placed in Hop 5 field 52 of second intermediate routing symbol 38K, and what had been in Hop 2 field 46 (SF1), Hop 3 field 48 (SF2), Hop 4 field 50 (SF3), and Hop 5 field 52 (user station (ring) 22E address of leaf node 20I) of first intermediate routing symbol 38J are transferred to Hop 1 field 44, Hop 2 field 46, Hop 3 field 48, Hop 4 field 50, respectively, of second intermediate routing symbol 38K. User station (ring) 22J address of leaf node 20J, which had been in Hop 1 field 44 of first intermediate routing symbol 38J is transferred to target field 42 of second intermediate routing symbol 38K.

After second intermediate routing symbol 38K is absorbed into node 20J, one further transformation, creating third intermediate routing symbol 38L, is performed by third routing symbol transformer 60 (see FIG. 10) of leaf node 20J. This transformation, creating third intermediate routing symbol 38L from second intermediate routing symbol 38K, is identical to the ones described above with regard to the creation of second intermediate routing symbol 38K from first intermediate routing symbol 38J, and first intermediate routing symbol 38J from first routing symbol 38I, and is shown in FIG. 7A.

Referring now to FIG. 7B, if client 28 of target leaf node 20J wishes to route a new data stream or control signal back to the source of the original data packet, leaf node 20I, a further transformation, called a client transformation, is performed on third intermediate routing symbol 38L by client 28 of target leaf node 20J (see FIG. 10).

Second preliminary routing symbol 38LC, the complement of third intermediate routing symbol 38L, is created by placing the contents of target field 42 of third intermediate routing symbol 38L, (SF1), into Hop 5 field 52 of second preliminary routing symbol 38LC and placing the contents of Hop 5 field 52 of third intermediate routing symbol 38L, (the user station (ring) 22J address of bridge node 54O), into target field 42 of second preliminary routing symbol 38LC; the contents of Hop 1 field 44 of third intermediate routing symbol 38L, (SF2), are moved to Hop 4 field 50 of second preliminary routing symbol 38LC and the contents of Hop 4 field 50 of third intermediate routing symbol 38L, (the central switch (ring) 23B address of bridge node 54D), is moved to Hop 1 field 44 of second preliminary routing symbol 38LC; the contents of Hop 2 field 46 of third intermediate routing symbol 38L, (SF3), is moved to Hop 3 field 48 of second preliminary routing symbol 38LC, and the contents of Hop 3 field 48 of third intermediate routing symbol 38L, (the user station (ring) 22E address of leaf node 20I), is moved to Hop 2 field 46 of second preliminary routing symbol 38LC.

Second routing symbol transformer 41 of leaf node 20J (see FIG. 10) creates a second routing symbol 38KC (FIG. 8A) by adding the user station (ring) address of leaf node 20J to second preliminary routing symbol 38LC. Again, it should be apparent to those skilled in the art that client 28 (not shown) of leaf node 20J could create second routing symbol 38KC in a single step. As will be discussed below, second routing symbol 38KC is the complement of second intermediate routing symbol 38K.

As second routing symbol 38KC enters bridge node 54O and thus automatically crosses bridge ring 23H (because of the degenerate nature of bridge ring 23H), a first intermediate routing symbol 38JC (the complement of first intermediate routing symbol 38J) is created by routing symbol transformer 55 of bridge node 54I (see FIG. 9). The user station (ring) 22J address of bridge node 54O in target field 42 of second routing symbol 38KC is dropped, and the central switch (ring) 23B address of bridge node 54I is added to first intermediate routing symbol 38JC in source field 40.

At the same time, user station (ring) 22J address of leaf node 20J in source field 40 of second routing symbol 38KC is placed in Hop 5 field 52 of first intermediate routing symbol 38JC, and what had been in Hop 2 field 46 (the user station (ring) 22E address of leaf node 20I), Hop 3 field 48, (SF3), Hop 4 field 50, (SF2), and Hop 5 field 52 (SF2) of second routing symbol 38KC are transferred to Hop 1 field 44, Hop 2 field 46, Hop 3 field 48, Hop 4 field 50, respectively, of first intermediate routing symbol 38JC. Central switch (ring) 23B address of bridge node 54D, which had been in Hop 1 field 44 of second routing symbol 38KC, is transferred to target field 42 of first intermediate routing symbol 38JC.

As was mentioned above, this bridge transformation is repeated, creating as many intermediate routing symbols 38 as are necessary until the final destination is reached, i.e., until the intermediate routing symbol is absorbed into leaf node 20I. In this example, the bridge transformation needs to be repeated once more.

As shown in first intermediate routing symbol 38JC, bridge node 54D is targeted next. As first intermediate routing symbol 38JC enters bridge node 54D and thus automatically crosses bridge ring 23C (because of the degenerate nature of bridge ring 23C), second intermediate routing symbol 38IC is created by routing symbol transformer 55 of bridge node 54O (see FIG. 9). Second intermediate routing symbol 38IC is the complement of first routing symbol 38I. The central switch (ring) 23B address of bridge node 54D in target field 42 of first intermediate routing symbol 38J is dropped, and the user station (ring) 22E address of bridge node 54J is added to second intermediate routing symbol 38IC in source field 40.

At the same time, the central switch (ring) 23B address of bridge node 54I in source field 40 of first intermediate routing symbol 38JC is placed in Hop 5 field 52 of second intermediate routing symbol 38IC, and what had been in Hop 2 field 46 (SF3), Hop 3 field 48 (SF2), Hop 4 field 50 (SF1), and Hop 5 field 52 (user station (ring) 22J address of leaf node 20J) of first intermediate routing symbol 38JC are transferred to Hop 1 field 44, Hop 2 field 46, Hop 3 field 48, Hop 4 field 50, respectively, of second intermediate routing symbol 38IC. User station (ring) 22E address of leaf node 20I, which had been in Hop 1 field 44 of first intermediate routing symbol 38JC is transferred to target field 42 of second intermediate routing symbol 38IC.

After second intermediate routing symbol 38IC is absorbed into node 20J, one further transformation, creating third intermediate routing symbol 38HC, is performed by third routing symbol transformer 60 (see FIG. 10) of leaf node 20I. As will become apparent below, third intermediate routing symbol 38HC is the complement of first preliminary routing symbol 38H. This transformation, creating third intermediate routing symbol 38HC from second intermediate routing symbol 38IC, is identical to the ones described above with regard to the creation of second intermediate routing symbol 38IC from first intermediate routing symbol 38JC, and first intermediate routing symbol 38JC from second routing symbol 38KC, and is shown in FIG. 8A.

Referring now to FIG. 8B, if original source leaf node 20I wishes to route a new data stream or control signal back to the original target leaf node 20I, a further transformation is performed on third intermediate routing symbol 38HC by second routing symbol transformer 41 of target leaf node 20J (see FIG. 10).

Preliminary routing symbol 38H is recreated from third intermediate routing symbol 38HC by placing the contents of target field 42 of third intermediate routing symbol 38HC, (SF3), into Hop 5 field 52 of preliminary routing symbol 38H and placing the contents of Hop 5 field 52 of third intermediate routing symbol 38HC, (the user station (ring) 22E address of bridge node 54J), into target field 42 of preliminary routing symbol 38H; the contents of Hop 1 field 44 of third intermediate routing symbol 38HC, (SF2), are moved to Hop 4 field 50 of preliminary routing symbol 38H, and the contents of Hop 4 field 50 of third intermediate routing symbol 38HC, (the central switch (ring) 23B address of bridge node 54I), is moved to Hop 1 field 44 of preliminary routing symbol 38H; the contents of Hop 2 field 46 of third intermediate routing symbol 38HC, (SF1), is moved to Hop 3 field 48 of preliminary routing symbol 38H, and the contents of Hop 3 field 48 of third intermediate routing symbol 38HC, (the user station (ring) 22J address of leaf node 20J), is moved to Hop 2 field 46 of preliminary routing symbol 38H.

Thus, only one routing symbol and the place in the network where it occurs are needed to provide routing information from a source node to a target node and back again.

At any intermediate point in the path of the stream, routing symbol 38 contains a list of source fields that points back to the original source, and a list of target fields pointing ahead to the ultimate target. Thus, for every stream headed by a routing symbol there is a complementary stream with a complementary routing symbol, such that a single field-swapping transformation on the received routing symbol will produce the routing symbol of its complement stream.

By using a single (centralized or distributed) resource for assigning routing symbols within a network, it is unnecessary for any node to account for source, target, or hop fields: a client treats routing symbols as values which are (incidentally) assigned as a function of the network topology and the specific path that the stream must follow.

A routing symbol as it appears on a ring along the path of a stream has a complement routing symbol that marks the complement stream on the same ring. In the example given above, routing symbol 38KC is the complement of routing symbol 38K on user station (ring) 22J; routing symbol 38JC is the complement of routing symbol 38J in central switch (ring) 23B; routing symbol 38IC is the complement of routing symbol 38I in user station (ring) 22E. The transformation shown in FIG. 11 converts between routing symbol 38J and its complement 38JC. However, this same transformation, referred to as a ring transformation, can be used to convert between any routing symbol and its complement on the same ring.

In the example shown in FIG. 11, routing symbol 38JC, the complement to routing symbol 38J, is created by moving the contents of source field 40 of routing symbol 38J (the central switch (ring) address of bridge node 54D) into target field 42 of routing symbol 38JC, and moving the contents of target field 42 of routing symbol 38J (the central switch (ring) address of bridge node 54I) into source field 40 of routing symbol 38JC. At the same time, the contents in Hop 1 field 44 (user station (ring) 22J address of leaf node 20J) of routing symbol 38J is placed into Hop 5 field 52 of routing symbol 38JC; the contents in Hop 5 field 52 (user station (ring) 22E address of leaf node 20I) of routing symbol 38J is placed into Hop 1 field 44 of routing symbol 38JC; the contents in Hop 2 field 46 (SF1) of routing symbol 38J is placed into Hop 4 field 50 of routing symbol 38JC; the contents in Hop 4 field 50 (SF3) of routing symbol 38J is placed into Hop 2 field 46 of routing symbol 38JC; and the contents in Hop 3 field 48 of routing symbol 38J are placed into Hop 3 field 48 of routing symbol 38JC.

The transformation is simple, and its symmetry is clear. As shown above, it can be performed at any point along the path from the source leaf node to the target leaf node. The only ambiguity occurs when a node routes a routing symbol to itself without crossing any bridges. In this case, to assure that a routing symbol and its complement are distinguishable, hop 1 must differ from hop 5, or hop 2 must differ from hop 4.

Complement routing symbols are used for control mechanisms that may be implemented in hardware. Besides a request for data and its response, these might include commands from the target leaf node (or any bridge node along the path from the source leaf node to the target leaf node) to the source leaf node to halt, resume, accelerate or decelerate the transmission of a stream.

For example, target leaf nodes send ticket symbols in response to voucher symbols received from source leaf nodes. As was discussed above, these ticket symbols indicate that the target leaf node has space to store incoming data. To route a ticket symbol back to the source leaf node, the target leaf node would use the complement of the routing symbol used to route the voucher symbol to the target leaf node. Thus, the target leaf node would be able to return a ticket symbol to the source leaf node without regard to the extent, complexity, or path redundancy of the total multiple-ring topology.

In summary, an apparatus and method for economical payload stream routing in a multiple-ring network has been described.

The present invention has been described in terms of a preferred embodiment. The invention, however, is not limited to the embodiment depicted and described. Rather, the scope of the invention is defined by the appended claims.

What is claimed is:

1. A data routing system comprising:
   a first communication ring having a first bridge node and a source leaf node,
   a second communication ring having a second bridge node and a target leaf node,
   a communication path for data transmission from said source leaf node by way of said first bridge node and said second bridge node to said target leaf node in accordance with a sequence of routing symbols,
   each of said routing symbols having a source field, a target field, and a hop field,
   said source leaf node placing a first routing symbol on said first communication ring,
   said source field of said first routing symbol containing a first identification number for said source leaf node, said target field of said first routing symbol containing a second identification number for said first bridge node on said first communication ring, and said hop field of said first routing symbol containing a third identification number for said target leaf node.

2. The data routing system of claim 1 wherein said second bridge node, on receipt of a penultimate routing symbol, places a final routing symbol on said second communication ring, said source field of said final routing symbol containing a fourth identification number for said second bridge node on said second communication ring, and said target field of said final routing symbol containing an identification number for said target leaf node.

3. The system of claim 1 wherein each of said first, second and third identification numbers is comprised of four bits.

4. The system of claim 2 wherein said target leaf node includes means for swapping contents of said source field and said target field of said final routing symbol.

5. A method for data routing in a system including a first communication ring having a first bridge node and a source leaf node, and a second communication ring having a second bridge node and a target leaf node, along a communication path from said source leaf node by way of said first bridge node and said second bridge node to said target leaf node in accordance with a sequence of routing symbols, comprising the steps of
   placing a first routing symbol on said first communication ring, each of said routing symbols having a source field, a target field, and a hop field, said source field of said first routing symbol containing a first identification number for said source node, said target field of said first routing symbol containing a second identification number for said first bridge node on said first communication ring, and said hop field of said first routing symbol containing a third identification number for said target leaf node,
   placing a final routing symbol on said second communication ring on receipt of a penultimate routing symbol by said second bridge node, said source field of said final routing symbol containing a fourth identification number for said second bridge node on said second communication ring, and said target field of said final routing symbol containing an identification number for said second leaf node.

6. A method of routing streams of data between a source node on a first communication ring and a target node on a second communication ring by way of a communication path including a plurality of bridge nodes, said source node having a source node address, said target node having a target node address, said bridge nodes including a first bridge node on said first communication ring and a second bridge node on said second communication ring, comprising the steps of:
   placing a first routing symbol on said first communication ring, each of said bridge nodes having a target address and a source address, said first routing symbol containing said target node address and said target addresses for each of said bridge nodes on said communication path,
   transforming a target address of said second bridge node to a source address of said second bridge node upon passage of a received routing symbol through said second bridge node to generate a transformed routing symbol, and
   utilizing said transformed routing symbol to route data from said target node back to said source node.

7. A method of routing streams of data and control signals between nodes on separate interconnection systems, wherein each system includes at least one leaf node and at least one bridge node, comprising the steps of:
   (a) generating a first routing symbol having a first ordered list of fields including a first target field, said first ordered list of fields including a source leaf node address, a target leaf node address and a target bridge node address, wherein said first ordered list of fields describes a routing path from an initial source leaf node to a target leaf node by way of a series of bridge nodes; and
   (b) transforming said first routing symbol into an intermediate routing symbol having a second ordered list of fields including a second target field, comprising the steps of:
     (1) replacing said target bridge node address with a source bridge node address for one of said bridge nodes in one of said fields, and
     (2) reordering said list of fields so that said target leaf node address is in said second target field; and
   (c) transforming said intermediate routing symbol received by said target leaf node into a second routing symbol, said second routing symbol complementary to said intermediate routing symbol and said second routing symbol having a second list of fields for describing a routing path back to said initial source leaf node from said target leaf node by way of said series of bridge nodes, said second list of fields including two leaf node addresses and a source bridge node address.

8. A method of routing streams of data and control signals between nodes on separate interconnection systems, wherein each system includes at least one leaf node and at least one bridge node, comprising the steps of:
   (a) generating a first routing symbol containing a first ordered list of fields including a first target field, said first ordered list of fields including two leaf node addresses and a target bridge node address, wherein said first ordered list of fields describes a routing path from an initial source leaf node to a target leaf node by way of a series of bridge nodes; and
   (b) transforming said first routing symbol before said first routing symbol is received by said target leaf node into a second routing symbol, said second routing symbol complementary to said first routing symbol, and said second routing symbol having a second list of fields for describing a routing path back to said initial source leaf node by way of said series of bridge nodes, said second list of fields including two leaf node addresses and a source bridge node address.

9. A method of routing streams of data and control signals between nodes on separate interconnection systems, wherein each system includes at least one leaf node and at least one bridge node, comprising the steps of:

(a) generating a first routing symbol having a first ordered list of fields including a first target field, said first ordered list of fields including two leaf node addresses and a target bridge node address, wherein said first ordered list of fields describes a routing path from an initial source leaf node to a target leaf node by way of a series of bridge nodes; and (b) transforming said first routing symbol into a second routing symbol, said second routing symbol complementary to said first routing symbol, and said second routing symbol having a second list of fields for describing a routing path back to said initial source leaf node by way of said series of bridge nodes, said second list of fields including two leaf node addresses and a source bridge node address.

* * * * *